US012801102B2

(12) United States Patent
Correa Marín

(10) Patent No.: US 12,801,102 B2
(45) Date of Patent: Nov. 17, 2026

(54) AUTOMATION SYSTEM FOR ASSET MANAGEMENT AND MAINTENANCE, BUILDING MANAGEMENT AND ENERGY MANAGEMENT

(71) Applicants: Juan Manuel Correa Marín, Bogota (CO); COMERCIALIZADORA BECOR S A, Bogota (CO)

(72) Inventor: Juan Manuel Correa Marín, Bogota (CO)

( * ) Notice: Subject to any disclaimer, the term of this patent is extended or adjusted under 35 U.S.C. 154(b) by 292 days.

(21) Appl. No.: 18/293,624

(22) PCT Filed: Mar. 12, 2022

(86) PCT No.: PCT/IB2022/052233
§ 371 (c)(1),
(2) Date: Jan. 30, 2024

(87) PCT Pub. No.: WO2023/007255
PCT Pub. Date: Feb. 2, 2023

(65) Prior Publication Data
US 2024/0337995 A1 Oct. 10, 2024

(51) Int. Cl.
*G05B 15/02* (2006.01)

(52) U.S. Cl.
CPC .................................... *G05B 15/02* (2013.01)

(58) Field of Classification Search
CPC ........ G05B 15/02; G05B 13/02; G05B 19/04; G05B 19/042; G05D 23/19; G06Q 10/06; G06Q 90/00; H04W 4/00
See application file for complete search history.

(56) References Cited

U.S. PATENT DOCUMENTS

| | | | | |
|---|---|---|---|---|
| 9,557,750 | B2 | 1/2017 | Gust et al. | |
| 9,825,467 | B2 | 11/2017 | Lee | |
| 10,248,091 | B2 * | 4/2019 | Viswanath | F24F 11/38 |
| 2003/0172002 | A1 * | 9/2003 | Spira | G06Q 30/0601 705/26.1 |
| 2015/0142991 | A1 | 5/2015 | Zaloom | |
| 2016/0028605 | A1 | 1/2016 | Gil et al. | |
| 2016/0261481 | A1 | 9/2016 | Ogata et al. | |
| 2019/0095480 | A1 | 3/2019 | Park et al. | |
| 2019/0156601 | A1 | 5/2019 | Sinha et al. | |
| 2020/0016228 | A1 | 1/2020 | Burch | |
| 2020/0162280 | A1 * | 5/2020 | Drees | H04L 41/0645 |

FOREIGN PATENT DOCUMENTS

| | | | | |
|---|---|---|---|---|
| CN | 109343426 A | 2/2019 | | |
| CN | 108900997 B | 11/2020 | | |
| JP | 2016163242 A | 9/2016 | | |
| WO | 19067631 Y | 4/2019 | | |
| WO | WO-2019067631 A1 * | 4/2019 | | G05B 15/02 |

* cited by examiner

*Primary Examiner* — Yuhui R Pan
(74) *Attorney, Agent, or Firm* — Reichel Stohry Dean LLP; Natalie J. Dean

(57) ABSTRACT

The present invention pertains to an automation system for asset and maintenance management, building management, and energy management, comprising four interconnected modules. The first module functions as a monitoring, management, and control module for devices; the second module serves as an artificial intelligence module; the third module operates as an energy efficiency module, and the fourth module functions as an asset and maintenance management module.

14 Claims, 3 Drawing Sheets

AUTOMATION SYSTEM FOR ASSET MANAGEMENT AND MAINTENANCE, BUILDING MANAGEMENT AND ENERGY MANAGEMENT

This application is the National Stage Application of PCT/IB2022/052233, filed on Mar. 12, 2022, which claims priority to Colombian Patent Application No. NC2021/0010185, filed on Jul. 30, 2021, which is incorporated by reference for all purposes as if fully set forth herein.

TECHNICAL FIELD

The present invention pertains to the Internet of Things (IoT), computerized asset and maintenance management systems (CMMS/EAM), building management systems (BMS), and energy management systems (EMS) integrated with artificial intelligence tools.

BACKGROUND OF THE INVENTION

Computer systems that monitor, manage, control, supervise, automate, and analyze information from mechanical, electronic, and electrical elements or equipment in industrial and service sectors are typically standalone solutions. An example of such a solution is described in U.S. Pat. No. 10,248,091 B2, which outlines a method and apparatus for providing equipment maintenance—essentially a single, independent solution. This method receives data captured by at least one sensor deployed in a location, associates the data with at least one equipment parameter, determines the need for an update of a risk measure associated with the equipment, and, upon detecting a deviation from a baseline greater than a threshold, updates the risk measure. When an update is needed, a ticket is generated for corrective action based on the risk measure, triggering the scheduling of the corrective action. However, this invention is specifically focused on equipment maintenance management and does not integrate asset management, building management, artificial intelligence, or energy management, as the present invention does.

Furthermore, US Patent US20160028605A1 presents certain systems and methods directed towards access features and/or improvement of the efficiency of the building system. While it includes aspects such as measuring occupant comfort, conserving energy in linear heating and cooling asset networks, and improving machine efficiency by increasing maintenance effectiveness, it is entirely focused on the energy management of heating equipment. There is no mention of integrating this management with other systems, such as equipment maintenance management, asset management, building management, or artificial intelligence.

Additionally, the invention presented in CN109343426A describes a method for detecting sensors in the Internet of Things-based public service system of an aircraft. This invention addresses issues related to sensor detection in aircraft but is solely focused on aircraft detection and lacks references to asset and maintenance management, building management, or energy management within a unified platform.

On another note, document CN108900997B introduces a method for detecting a chain of industrial process equipment using a distributed wireless sensor network. While it focuses on wireless detection, industrial process equipment failure prediction, and self-leaning expert base, it does not refer to the management of other disciplines, such as asset management, building management, or artificial intelligence, which are integral components of the present invention.

U.S. Pat. No. 9,557,750B2 introduces a control system for operating HVAC systems within a building to control environmental conditions. This invention mentions building management with regard to HVAC system monitoring but does not involve the management and monitoring of other processes or devices, which is a key aspect of the present invention.

JP2016163242A aims to reduce the load on a network or a computer on the central installation side, making data size variable, focusing on data acquisition, analysis, and action through a gateway. However, it does not integrate multiple disciplines into a single platform for managing various processes and equipment involved in different industries.

Lastly, US Patent US20150142991A1 refers to an electronic hub device used to collect, store, and process potentially massive periodic data flows indicative of real-time measurement parameters or other data. It particularly focuses on real-time data analysis based on different parameters but does not take action on any device or process.

In conclusion, although there are documents that present the capture, analysis, and action on a device or process, each of these is directed towards different objects and processes. None of them integrates the capture, analysis, and action in the four disciplines of the present invention: asset and maintenance management, building management, energy management, and artificial intelligence. This integration represents a significant advancement in the technological sector, and its characteristics do not correspond to the sum or combination of one or more of the cited documents.

DESCRIPTION OF THE INVENTION

The present invention aims to integrate into a single digital platform an automation system that combines asset and maintenance management, building management, energy management, and artificial intelligence. This integration allows for the correlation and seamless integration of these disciplines, facilitating the development of a computer system that easily adapts to the needs of any industrial or service sector company for taking actions on its equipment and processes through a Gateway.

Specifically, the present invention introduces an automation system for asset and maintenance management, building management, and energy management, comprising the following four modules: a monitoring, management, and control module for devices, an asset and maintenance management module, an energy efficiency module, and an artificial intelligence module.

The monitoring, management, and control module for devices collect information from the sensor network through a Gateway, which receives information from sensors either wired or wirelessly and automated actions sent from the platform for device activation or deactivation. This module also stores, organizes, and classifies sensor information, sending it to any of the following modules: asset management module, energy efficiency module, and/or artificial intelligence module.

The asset and maintenance management module associates the collected data with the related asset. On the other hand, the energy efficiency module associates and monitors the received data from each related asset. The artificial intelligence module automates information from other modules, analyzes data, and sends actions to each module and the gateway for device activation or deactivation. This artificial intelligence module receives information from the monitoring, management, and control module for devices and, based on it, detects anomalies, predicts behaviors, formulates new variables, and automates information, instructing the gateway to activate or deactivate devices. This artificial intelligence module receives information from the asset and maintenance management module with the definition of maintenance plans and triggers the execution of work orders. It also receives information from the energy efficiency module with details on non-conformities and operational controls, energy performance indicators, baselines, and the establishment and monitoring of savings goals, subsequently triggering operational controls, resolution of non-conformities, and the execution of work orders.

In a particular embodiment, the artificial intelligence module comprises a processor that can be basic or advanced. The basic analytics processor includes a first component called mathematical formulas that receives information from different equipment and generates analysis variables or indicators. A second component called automation uses the indicators generated in the mathematical formulas, the results of advanced analytics, information collected from the sensor network, information from the asset and maintenance management module, and information from the energy management module to create a series of conditions. Once evaluated, these conditions allow the execution of automatic rules such as activating or deactivating equipment, executing condition-based maintenance plans, resolving non-conformities, performing operational controls, and generating alarms or dynamic alerts correlated with one or more variables.

The advanced analytics processor, with the use of artificial intelligence, includes a first component for data analysis through graphs. Based on information collected from different equipment, it generates graphs for comparative analysis, correlation, trend analysis, alarm analysis, average analysis, and detection of historical anomalies. The second component, utilizing historical data and artificial intelligence techniques, uses models representing the behavior of analyzed variables to predict future behavior, detect real-time anomalies, analyze averages based on behavior by time of day or day of the week, analyze correlations with the analyzed variable, trends and histograms, and activate the automation process. A third component, the action module, receives the results of the analyses performed in the advanced analytics processor and creates improvement and future failure prevention projects. Each project can define objectives, duration, director, stakeholders, and project activities. It generates baseline behavior for historical and current variable data, establishes Key Performance Indicators (KPIs) for equipment behavior concerning historical behavior and predictions, and establishes operational controls or activities executed as part of a project or triggered by automation.

The asset and maintenance management module includes the management of maintenance plans, visualization of KPIs, report and report management, work order management, and asset management administration at different locations. Maintenance is established for each asset, associated with preventive maintenance, corrective maintenance, and/or condition-based maintenance. Preventive maintenance has a scheduled execution, corrective maintenance is performed upon request due to detected process failures, and condition-based maintenance is based on the parameterization done in the automation module that each variable or group of variables can activate based on a rule for plan execution.

Work orders are generated based on the scheduling of maintenance plans, where authorized personnel must assign tasks to in-house or third-party personnel for execution. Operational staff receives the work order with assigned tasks through the platform's messaging service or via email. Once tasks are completed, they are automatically sent to authorized personnel for approval or disapproval.

The visualization of KPIs and reports is generated based on information collected from assets and generated work orders. The system automatically calculates the following performance indicators: Total Availability, Reliability (Availability due to failures), Mean Time Between Failures (MTBF), and Mean Time to Repair (MTTR). These indicators can be viewed by asset, related asset group, or site. Additionally, the system automatically performs the following analyses' Task analysis, failure analysis, and work order analysis. These can be viewed by asset, related asset group, site, or by the user responsible for the asset or task execution.

Asset administration (infrastructure, equipment, etc.) at different locations is carried out by organizing a hierarchical structure to easily locate any asset within the hierarchy. All assets included below it can affect its KPIs.

The energy management module allows for recording and monitoring an Energy Management System (EMS) based on ISO 50001. Through knowledge of the business and measurements of consumption, Significant Energy Uses (SEUs) can be established and recorded, related in a productive energy diagram through a Sankey diagram. This allows visualizing the uses and types of energy used in processes. Energy efficiency projects aimed at reducing energy consumption can be created and applied to one or several SEUs, with established savings goals. In each project, a Baseline can be automatically established for comparison against a monitoring period to evaluate SEU performance through standard or user-created Energy Performance Indicators (EPIs). Operational controls can be created to be executed within one or several projects, verified periodically to improve the energy performance of SEUs.

DETAILED DESCRIPTION OF THE INVENTION

Figure 1:
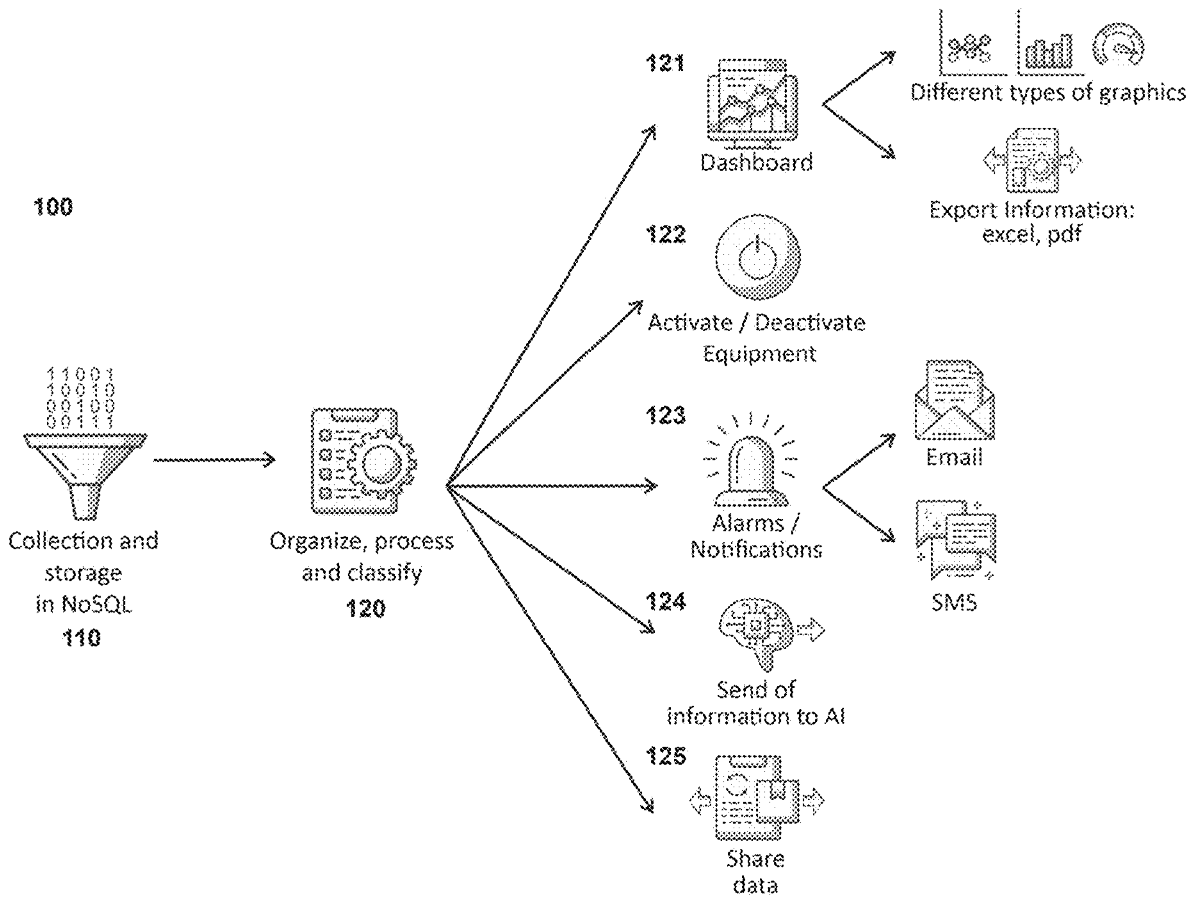
FIG. 1. Monitoring, Management, and Control Module for Devices.

The present invention relates to an automation system for asset and maintenance management, building management, and energy management, comprising four interconnected modules: a first module, which is the device monitoring, management, and control module (100); a second module, an artificial intelligence module (200); a third module, an energy efficiency module (300); and a fourth module, an asset and maintenance management module (400).

The module in FIG. 1, the device monitoring, management, and control module (100), collects and stores information in NoSQL (110), which is later organized, processed, and classified (120) in a database. Once the processed information is available, it can be used to visualize data using configurable widgets and dashboards (121), turn devices on or off (122) through the gateway, generate alarms and notifications via email and SMS (123) based on the collected data, send information to the Artificial Intelligence module (124) for processing, and share data (125) with the asset and maintenance management modules and the energy efficiency module.

Figure 2:
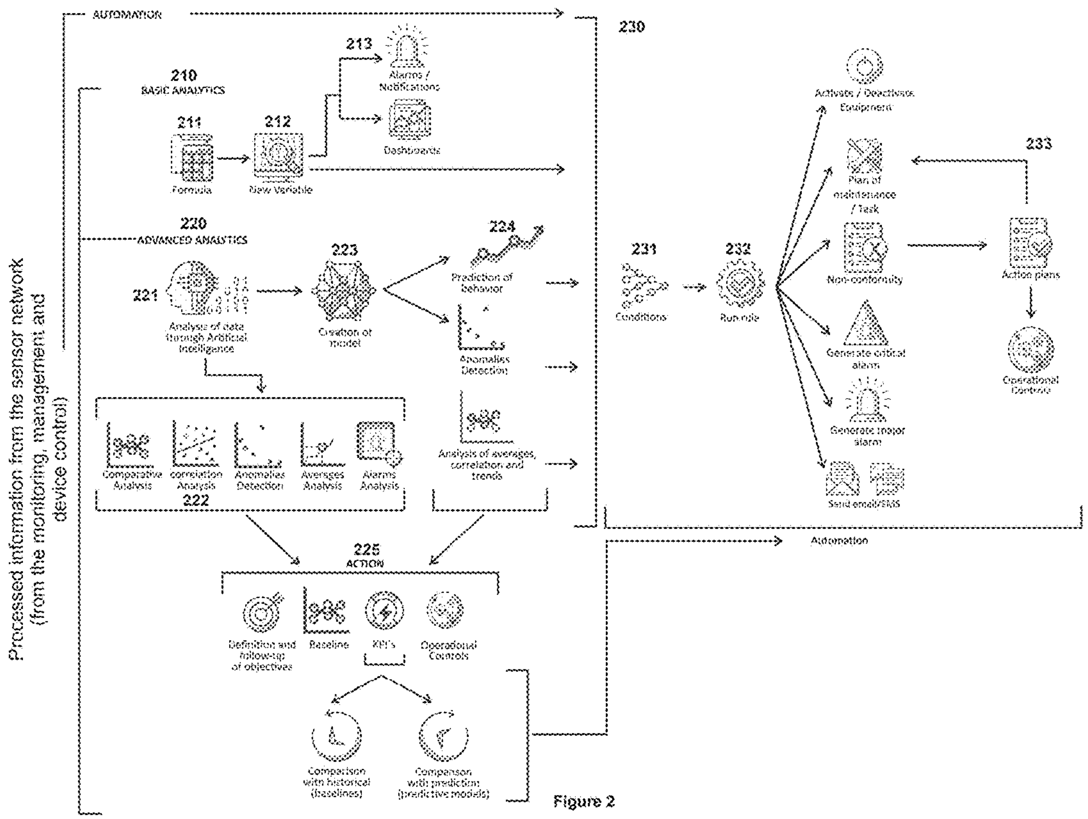
FIG. 2. Artificial Intelligence Module.
Figure 3:
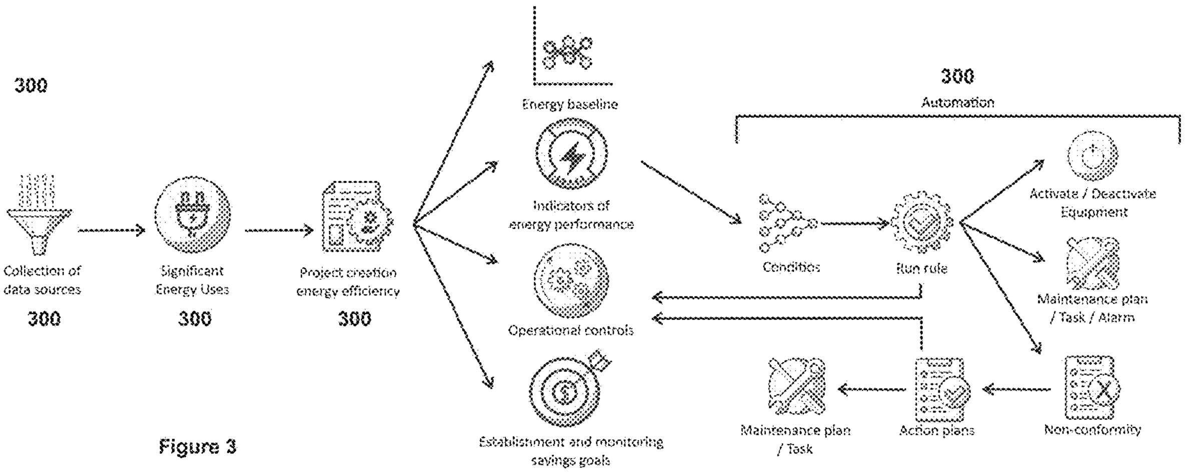
FIG. 3. Energy Efficiency Module.
Figure 4:
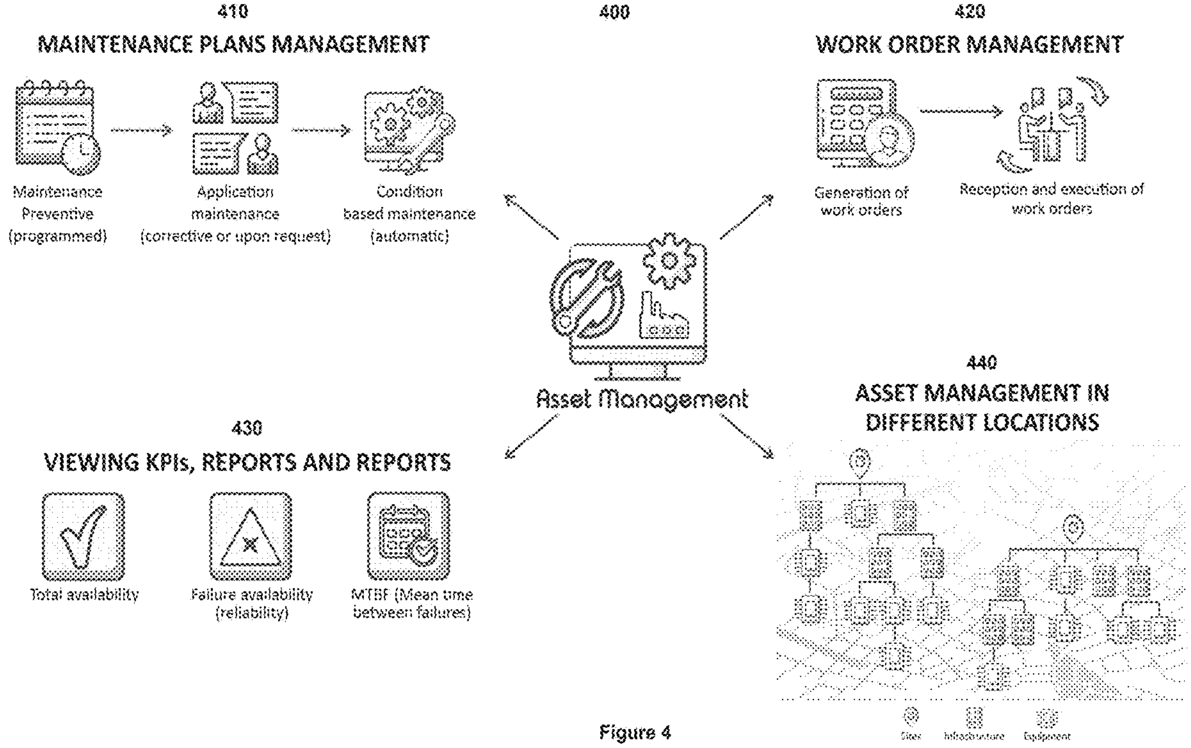
FIG. 4. Asset and Maintenance Management Module.

The processed information from the sensor network in FIG. 1 is received by the artificial intelligence module in FIG. 2, which includes a basic analytics module (210), advanced analytics module (220), action module (225), and automation module (230).

The basic analytics module (210) creates formulas and performs mathematical operations (211) from which it generates a new analysis variable or indicator (212) to be visualized in configurable widgets and dashboards or to trigger alarms and notifications (213). Finally, this information is integrated with the automation module (230).

The advanced analytics module (220) analyzes historical variables using artificial intelligence (221), which includes a comparative graphical analysis tool between variables, correlation analysis, alarm analysis, average analysis, and anomaly detection (222). It also involves the creation of models (223) to detect anomalies in real-time, predict behavior, analyze averages, correlation, and trends (224), and an action module (225) that allows users to create improvement projects based on the results of the analyses done in the graphical analysis tool and the creation of models. It further allows the creation of projects with objectives, timelines, directors, stakeholders, and activities, as well as the generation of baselines, establishment of KPIs, and operational controls.

Automation Module (230) includes creating a series of conditions (231) and evaluating the conditions to determine the execution of the following rules: Activating or deactivating equipment, executing specific tasks or condition-based maintenance plans, generating a non-conformity, generating a critical or major alarm, and sending notifications (232). As a result of the non-conformity, an action plan is generated that executes operational controls related to the energy efficiency module and the Action tool or condition-based maintenance plans (233).

The Energy Efficiency Module (300) collects data from sensors or processed information from the device monitoring, management, and control module (310). It then establishes and records Significant Energy Uses (320), which include: Relating Energy Uses in a Sankey diagram; visualizing the types and uses of energy used; and defining the relationship between the uses and types of energy used by processes and defining energy projects (330) for one or more of the Significant Energy Uses. Within each energy project, the following are defined: Efficiency objectives; execution times; and work teams and activities to be carried out. Within each energy project, baselines, performance indicators, operational controls, and the establishment and monitoring of savings goals are set. Depending on the performance indicator results, information is sent to the automation module (340).

The Asset and Maintenance Management Module (400) receives processed information from the device monitoring, management, and control module. It associates the information with the corresponding asset, digitizes information about physical assets, manages Maintenance Plans (410), manages work orders (420), visualizes KPIs, and analyzes tasks (430). It also administers assets (440).

Specifically, the Management of Maintenance Plans includes Preventive Maintenance Plans, Predictive Maintenance Plans, and Condition-Based Maintenance Plans; the Management of work orders includes receiving the work order, assigning personnel for execution, receiving them with the tasks performed for approval or disapproval; KPI Visualization includes automatically calculating KPIs by asset, by related group of assets, or by site. The Analysis of tasks, failures, and work orders involves analyzing assets or sites. Finally, the administration of assets is carried out in different locations.

While the above detailed description describes some examples of the technology and describes the best anticipated way, no matter how detailed the foregoing may appear in the text, the technology can be practiced in many ways.

Details may vary in implementation while still falling within the scope of the technology described in this document. As noted earlier, the particular terminology used to describe certain features or aspects of the technology is not limited to any specific features or aspects associated with that terminology. In general, the terms used in the following claims should not be construed to limit the technology to the specific examples described herein. Accordingly, the scope of the technology encompasses not only the described examples but also all equivalent forms of practicing or implementing the technology.

The invention claimed is:

1. An automation system for asset and maintenance management, building management, and energy management structured in a single configurable digital platform that functionally and operationally integrates four modules for a company in the industrial and services sector, wherein the first module is a device monitoring, management and control module, the second module is an artificial intelligence module, the third module is an energy management module, and the fourth module is an asset and maintenance management module, wherein the four modules are interconnected and exchange data and control commands, and each have instructions stored thereon which, when executed, cause the system to perform operations, and wherein:

the device monitoring, management and control module collects, processes, stores, and distributes information from a sensor network to the artificial intelligence module, the energy management module, and the module for asset and maintenance management for a company in the industrial and services sector;

the artificial intelligence module includes:

(i) a basic analytics module comprising a first component called mathematical formulas with means to create configurable variables by mathematical and logical operations applied to real-time data and historical data according to each user's needs, and a second component called automation including means for integrating the variables that, once evaluated, allow execution of automatic rules;

(ii) an advanced analytics module having a first component for data analysis using artificial intelligence based on analysis of historical variables, including a tool for comparative graphical analysis between variables, correlation analysis, alarm analysis, average analysis and anomaly detection, and a second component for data analysis using artificial intelligence with advanced analytics that applies analysis tools to detect anomalies in real time, analyze averages, correlations and trends, and create predictive models that predict behavior; and an action component including means to create improvement projects and prevent future failures; and (iii) an automation module comprising means to execute automatic rules based on analyses from the device monitoring, management and control module, the energy management module, and the module for computerized asset and maintenance management, or the artificial intelligence module itself, with instructions stored thereon which, when executed, allow for: receiving processed information; creating a set of conditions between two or more variables; evaluating the conditions and determining execution of the following rules: activating or deactivating equipment, executing specific tasks or condition-based maintenance plans, generating a nonconformity, generating a critical or major alarm, and sending notifications;

the energy management module is for recording, visualization and analysis of Significant Energy Uses, which define an energy project with instructions stored thereon which, when executed, establish the energy baseline of the model that represents the behavior of the Energy Use and the processing of energy indicators and information; and the asset and maintenance management includes maintenance plans comprising preventive maintenance plans, corrective maintenance plans and condition-based maintenance plans, management of performance-indicator visualization comprising automatically calculating key performance indicators per asset, per related group of assets or per site, management of reports and statements based on information collected from the assets and generated work orders, management of work orders comprising receiving the work order, assigning personnel for execution, receiving the orders with the tasks performed for approval or disapproval, and management of asset administration at different locations such that any asset can be located within the hierarchy and all assets included beneath it can affect its performance indicators.

2. The system of claim 1, wherein the device monitoring, management and control module has stored instructions wherein, when executed, cause the system to perform operations comprising:

collecting information from the sensors and storing such data in a NoSQL database;

organizing, processing and classifying the information;

visualizing the data using configurable widgets and dashboards;

turning devices on or off through the gateway;

generating alarms based on the collected data;

sending the information to the artificial intelligence module for processing; and sharing data with the asset and maintenance management module and the energy management module.

3. The system of claim 1, wherein the first component of the basic analytics module of the artificial intelligence module has stored instructions which, when executed, cause the system to perform operations comprising:

receiving the processed information from the device monitoring, management and control module;

creating formulas and performing mathematical operations with the different variables;

creating a new analysis variable or indicator, to which a name is assigned and which is stored in a database;

generating alarms and sending e-mails and SMS messages;

visualizing the new variable in configurable widgets and dashboards in the device monitoring, management and control module; and integrating information into the automation module of the artificial intelligence module.

4. The integrated system of claim 1, wherein the second component for data analysis using artificial intelligence, based on analysis of historical variables, has instructions stored thereon which, when executed, cause the system to perform operations comprising:

receiving the processed information from the device monitoring, management and control module;

analyzing historical variables;

creating analytics models that represent the behavior of a variable; and creating improvement projects and prevention of future failures from the action component of the advanced analytics module.

5. The integrated system of claim 1, wherein the action component of the advanced analytics module of the artificial intelligence module has stored instructions which, when executed, cause the system to perform operations comprising:

creating the project including:

I. objectives,

II. time, and

III. leader, stakeholders and activities, generating baselines representing the historical and current behavior of a variable;

establishing key performance indicators representing how the behavior of equipment or a variable is varying with respect to historical behavior and prediction, comprising:

I. comparison of historical data, and

II. comparison with prediction; and creating operational controls.

6. The integrated system of claim 1, wherein the instructions of the energy management module, when executed, cause the system to perform operations comprising:

receiving the processed information from the device monitoring, management and control module;

establishing and recording the significant energy uses;

defining an energy project for one or more of the significant energy uses which includes:

relating the energy uses in a Sankey diagram;

visualizing the types and uses of energy used; and defining the relationship between the uses and types of energy used by processes;

defining an energy project for one or more significant energy uses including:

I. efficiency objectives;

II. execution times; and

III. work team and activities to be carried out.

7. The integrated system of claim 5, wherein the energy project submodule of the energy management module includes a component having instructions stored thereon which, when executed, builds a baseline reference model based on collected historical data, which represents the behavior of the registered energy uses under prior operating conditions.

8. The integrated system of claim 6, wherein the energy project submodule of the energy management module has instructions stored thereon which, when executed, cause the system to perform operations including calculating energy performance indicators based on the stored historical and current data and recording the progress status of said submodule in terms of efficiency and effectiveness.

9. The integrated system of claim 7, wherein indicators calculated by the energy project submodule of the energy management module are transferred to the artificial intelligence module, where they are evaluated and actions are taken.

10. The integrated system of claim 7, wherein the energy project submodule of the energy management module includes operational controls or concrete actions executed on an asset to improve the performance of the significant energy uses.

11. The integrated system of claim 9, which further includes a component that activates concrete actions on specific assets according to predefined critical values related to energy variables recorded by sensors of the device monitoring, management and control module.

12. The integrated system of claim 7, wherein the energy project submodule of the energy management module includes stored instructions which, when executed, cause the system to perform operations comprising establishing and monitoring saving targets, comprising measuring and verifying the values received in the device monitoring, management and control module versus the baseline and the saving target.

13. The integrated system of claim 1, wherein the asset and maintenance management module has stored instructions which, when executed, cause the system to perform operations comprising:

receiving the processed information from the device monitoring, management and control module;

associating to the corresponding asset;

digitizing information of physical assets;

managing maintenance plans as resolution of nonconformities, scheduling interventions according to their condition and calculating indicators associated with mean time between failures (MTBF) and mean time to repair (MTTR);

managing work orders;

visualizing key performance indicators;

analyzing tasks; and administering assets.

14. The integrated system of claim 13, wherein the analysis of tasks, failures and work orders comprises analysis of assets or sites at different locations.

* * * * *